United States Patent
Ite et al.

(10) Patent No.: US 10,175,134 B2
(45) Date of Patent: Jan. 8, 2019

(54) PHYSICAL QUANTITY MEASURING DEVICE

(71) Applicant: NAGANO KEIKI CO., LTD., Tokyo (JP)

(72) Inventors: Takayuki Ite, Tokyo (JP); Yasuyuki Suzuki, Tokyo (JP); Toshinori Suzuki, Tokyo (JP); Hideki Muramatsu, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 197 days.

(21) Appl. No.: 15/252,703

(22) Filed: Aug. 31, 2016

(65) Prior Publication Data

US 2017/0059438 A1 Mar. 2, 2017

(30) Foreign Application Priority Data

Sep. 2, 2015 (JP) .................................. 2015-172563

(51) Int. Cl.
G01K 19/00 (2006.01)
G01L 19/08 (2006.01)
(Continued)

(52) U.S. Cl.
CPC ............ G01L 27/002 (2013.01); G01K 19/00 (2013.01); G01L 19/086 (2013.01);
(Continued)

(58) Field of Classification Search
CPC ..... G01K 19/00; G01L 19/086; G01L 19/143; G01L 27/002; H04B 10/69
See application file for complete search history.

(56) References Cited

U.S. PATENT DOCUMENTS

2004/0113813 A1\* 6/2004 Henson .................. G01L 7/043
340/870.07
2005/0109116 A1 5/2005 Kurtz et al.
(Continued)

FOREIGN PATENT DOCUMENTS

EP 1850096 10/2007
JP 3756969 1/2006
(Continued)

OTHER PUBLICATIONS

European Search Report dated Jan. 31, 2017, 8 pages.
Japanese Office Action with English translation dated Apr. 17, 2018, 6 pages.

*Primary Examiner* — Francis C Gray
(74) *Attorney, Agent, or Firm* — Rankin, Hill & Clark LLP

(57) ABSTRACT

A controller includes: a communication attachment member configured to be detachably attached to a measuring device body; a second light emitter/receiver provided to a communication attachment member and configured to transmit/receive a signal to/from a first light emitter/receiver of the measuring device body; and a second controller configured to transmit/receive a signal to/from the second light emitter/receiver. An electronic circuit unit, electronic calibration unit, first control unit, signal transmission unit and the first light emitter/receiver are provided inside a housing of the measuring device body. A window is hermetically provided to a plate of the measuring device body. The communication attachment member includes a cover configured to be disposed so that the second light emitter/receiver faces the window and an engagement portion provided to the cover to be engageable with the housing.

6 Claims, 13 Drawing Sheets

(51) Int. Cl.
  *G01L 19/14* (2006.01)
  *G01L 27/00* (2006.01)
  *H04B 10/69* (2013.01)
  *H04B 10/079* (2013.01)

(52) U.S. Cl.
  CPC ........ *G01L 19/143* (2013.01); *H04B 10/0795* (2013.01); *H04B 10/69* (2013.01)

(56) References Cited

U.S. PATENT DOCUMENTS

| | | |
|---|---|---|
| 2009/0120195 A1 | 5/2009 | Wilcox |
| 2012/0079884 A1* | 4/2012 | Broden ................ G01L 13/026 73/717 |
| 2015/0157791 A1* | 6/2015 | Desch .................... G16H 10/65 604/506 |
| 2016/0322831 A1* | 11/2016 | Gilbert .................. G01D 11/00 |

FOREIGN PATENT DOCUMENTS

| | | |
|---|---|---|
| JP | 2006-510035 | 3/2006 |
| JP | 2009-166752 A | 7/2009 |
| JP | 2011-503576 A | 1/2011 |
| JP | 2013-250148 A | 12/2013 |
| WO | 2004/053450 A1 | 6/2004 |

\* cited by examiner

PHYSICAL QUANTITY MEASURING DEVICE

The entire disclosure of Japanese Patent Application No. 2015-172563 filed Sep. 2, 2015 is expressly incorporated by reference herein.

TECHNICAL FIELD

The present invention relates to a physical quantity measuring device.

BACKGROUND ART

Some of known physical quantity measuring devices include communication units through which measurement data is outputted to an outside.

A typical example of such a physical quantity measuring device in a form of a pressure measurement device includes: a housing; a converter provided to the housing and configured to generate electric signals based on a pressure at an inlet; and a data communication device connected to the converter to transmit wireless signals in accordance with the electric signals (Patent Literature 1: JP-A-2006-510035).

Another typical example of the physical quantity measuring device in a form of a temperature measurement unit includes: a closed housing that houses a sensor element for detecting physical quantity (e.g. temperature) and a memory storing the data detected by the sensor element; and an interface disposed on a surface of the housing (Patent Literature 2: JP-B2-3756969).

Patent Literature 2 discloses that, when a temperature measurement unit is inserted into a recess of a communication unit, the measurement data stored in the memory is transferred to a PC and the like through the communication unit using an optical communication.

The physical quantity measuring device for measuring pressure and temperature requires a zero point calibration, a contact point output setting and the like after the physical quantity measuring device is assembled. The calibration and setting are performed by operating an electronic calibration unit (e.g. a volume adjuster) provided on a circuit board inside the measuring device using a tool such as a screwdriver.

In addition, since the wireless communication is easily affected by disturbances (e.g. electric wave noise and optical noise), it is necessary to furnish an environment capable of stable communication. However, the possible problem associated with the disturbances is avoided by increasing the number of retries for communication.

Though Patent Literatures 1 and 2 disclose an arrangement for outputting the measurement data to the outside through a communication unit, the details of the setting for an electronic calibration unit are not disclosed. Thus, when a zero point calibration and the like are to be performed, a volume adjuster has to be operated using a screwdriver, so that the calibration work becomes troublesome and complicated waterproof structure is required.

Further, Patent Literatures 1 and 2 do not mention the stability of the wireless communication. Thus, whether or not the communication is securely performed is usually checked by an error analysis of communication data (using a check sum, parity check and the like), and it is not checked whether the stable communication environment is furnished or not.

SUMMARY OF THE INVENTION

An object of the invention is to provide a physical quantity measuring device that is easily capable of calibrating an electronic calibration unit even after the device is assembled, requires only a simple waterproof structure and is capable of eliminating an influence of disturbances in a wireless communication.

A physical quantity measuring device according to an aspect of the invention includes: a measuring device body including: a housing comprising a cylindrical case; a plate provided at a first open end of the cylindrical case; a detector provided to a second open end of the cylindrical case and configured to detect a physical quantity of a target fluid; an electronic circuit unit configured to receive a signal detected by the detector; an electronic calibration unit configured to calibrate the electronic circuit unit; a first control unit configured to control an external signal; a signal transmission unit electrically connected to the first control unit; and a first light emitter/receiver provided to the signal transmission unit and configured to receive and send the external signal; and a controller including: a communication attachment member configured to be detachably attached to the measuring device body; a second light emitter/receiver attached to the communication attachment member and configured to receive the signal from the first light emitter/receiver and send the signal to the first light emitter/receiver; and a second controller configured to receive the signal from the second light emitter/receiver and send the signal to the second light emitter/receiver, in which a window that is configured to allow transmission/reception of the signal between the first light emitter/receiver and the second light emitter/receiver is hermetically provided to the plate, the electronic circuit unit, the electronic calibration unit, the first control unit, the signal transmission unit and the first light emitter/receiver are provided inside the housing, and the communication attachment member comprises a cover configured to be disposed so that the second light emitter/receiver faces the window and an engagement portion provided to the cover to be engageable with the housing.

According to the above aspect of the invention, in order to perform calibration and setting for the electronic circuit unit (e.g. a zero point calibration and contact point output setting), the communication attachment member is attached to the measuring device body. In this state, the second light emitter/receiver of the communication attachment member faces the window of the measuring device body. Subsequently, the controller is operated. The signal from the second light emitter/receiver issued by the second controller of the controller is sent to the first light emitter/receiver through the window. The signal sent to the first light emitter/receiver is received by the first control unit. The electronic calibration unit performs the setting and calibration of the electronic circuit unit based on the received signal. When the calibration and the like of the electronic circuit unit are completed, the communication attachment member is detached from the measuring device body. In this state, a normal measurement is performed by the measuring device body.

In the above aspect of the invention, the signal issued by the controller is transmitted to the second light emitter/receiver of the communication attachment member through the second controller and processed by the electronic calibration unit through the signal transmission unit of the measuring device body and the first control unit.

Accordingly, the setting and the like of the electronic circuit unit can be easily done using the controller without using a tool (e.g. a screwdriver) in the above aspect of the invention.

Further, the engagement portion provided to the cover engages with the housing so that the first light emitter/ receiver faces the second light emitter/receiver with an appropriate positional relationship. Accordingly, the disturbance undesirable for communication can be eliminated and stable communication is achievable.

Further, since the window is hermetically provided to the plate and the electronic circuit unit, the electronic calibration unit, the first control unit, the signal transmission unit and the first light emitter/receiver are disposed inside the housing, a water-proof structure can be easily provided.

In the above aspect of the invention, it is preferable that a signal checker configured to check transmission/reception of the signal between the measuring device body and the controller is provided, in which the signal transmitted/received between the first light emitter/receiver and the second light emitter/receiver is an infrared signal.

The communication environment for a wireless communication using electric waves can be checked by measuring electromagnetic strength in advance. However, such an advance check as in wireless communication is not available for the infrared communication.

Thus, the signal checker that generates the pulse signals by flashing infrared rays is provided to generate the pulse signals independent of a character signal transmission/reception and error check function in the communication, and the number of pulses are counted to reliably check the communication environment.

In the above aspect of the invention, it is preferable that the controller includes: a controller body provided with the second controller; and a cord connected to the controller body and the communication attachment member, the cord allowing the transmission/reception of the signal between the second controller and the second light emitter/receiver.

In the above arrangement, an operator performs an operation with the controller body in hand. Since the controller body and the communication attachment member are connected to each other through the cord, even when the measuring device body is at a position remote from the operator, an operation for calibrating the electronic calibration unit and the like can be performed.

Further, since the disturbance undesirable for the communication can be removed and one-to-one signal transmission/reception to/from the controller body is achievable even when a plurality of the measuring device bodies are provided, a stable communication is achievable.

In the above aspect of the invention, it is preferable that the cord is detachable from the controller body, and the controller body includes a third light emitter/receiver configured to receive the signal from the first light emitter/receiver and send the signal to the first light emitter/receiver.

With the above arrangement, the third light emitter/receiver of the controller body is capable of a direct signal transmission/reception to/from the first light emitter/receiver of the measuring device body. Thus, it is not necessary to attach the communication attachment member to the measuring device body.

In the above aspect of the invention, it is preferable that the plate includes a connection pin connected to the signal transmission unit and a cylindrical portion surrounding the connection pin, the cover includes a recess configured to be in contact with an outer circumference of the cylindrical portion, and the engagement portion includes an engagement piece configured to be engaged with an outer circumference of the cylindrical case.

According to the above arrangement, since the recess of the cover is located on the outer circumference of the cylindrical portion provided on the plate, the communication attachment member can be accurately attached to the measuring device body.

BRIEF DESCRIPTION OF DRAWING(S)

DESCRIPTION OF EMBODIMENT(S)

First Exemplary Embodiment

A first exemplary embodiment of the invention will be described below with reference to FIGS. 1 to 8.

Figure 1:
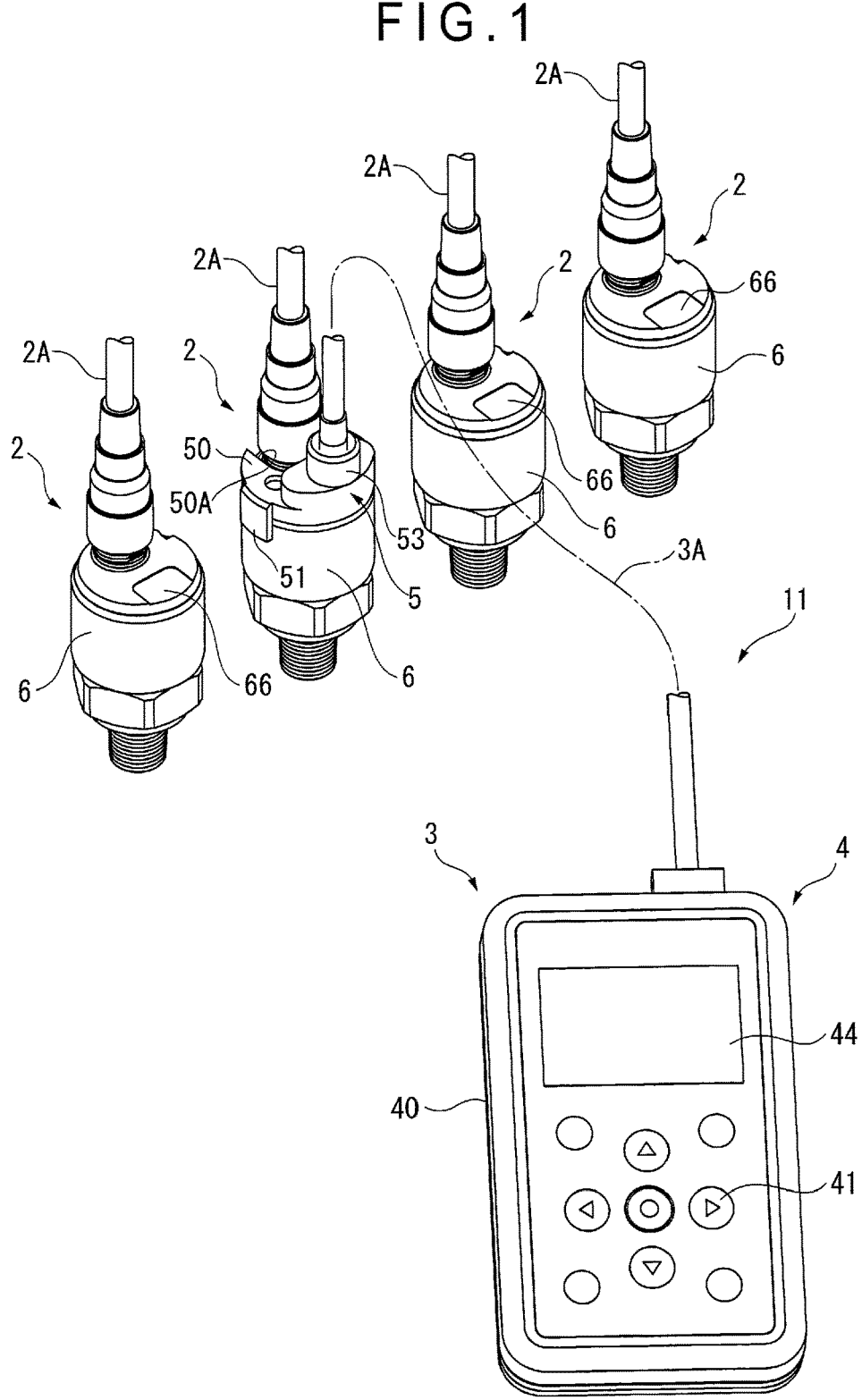
FIG. 1 is a perspective view showing a physical quantity measuring device according to a first exemplary embodiment of the invention.
Figure 2:
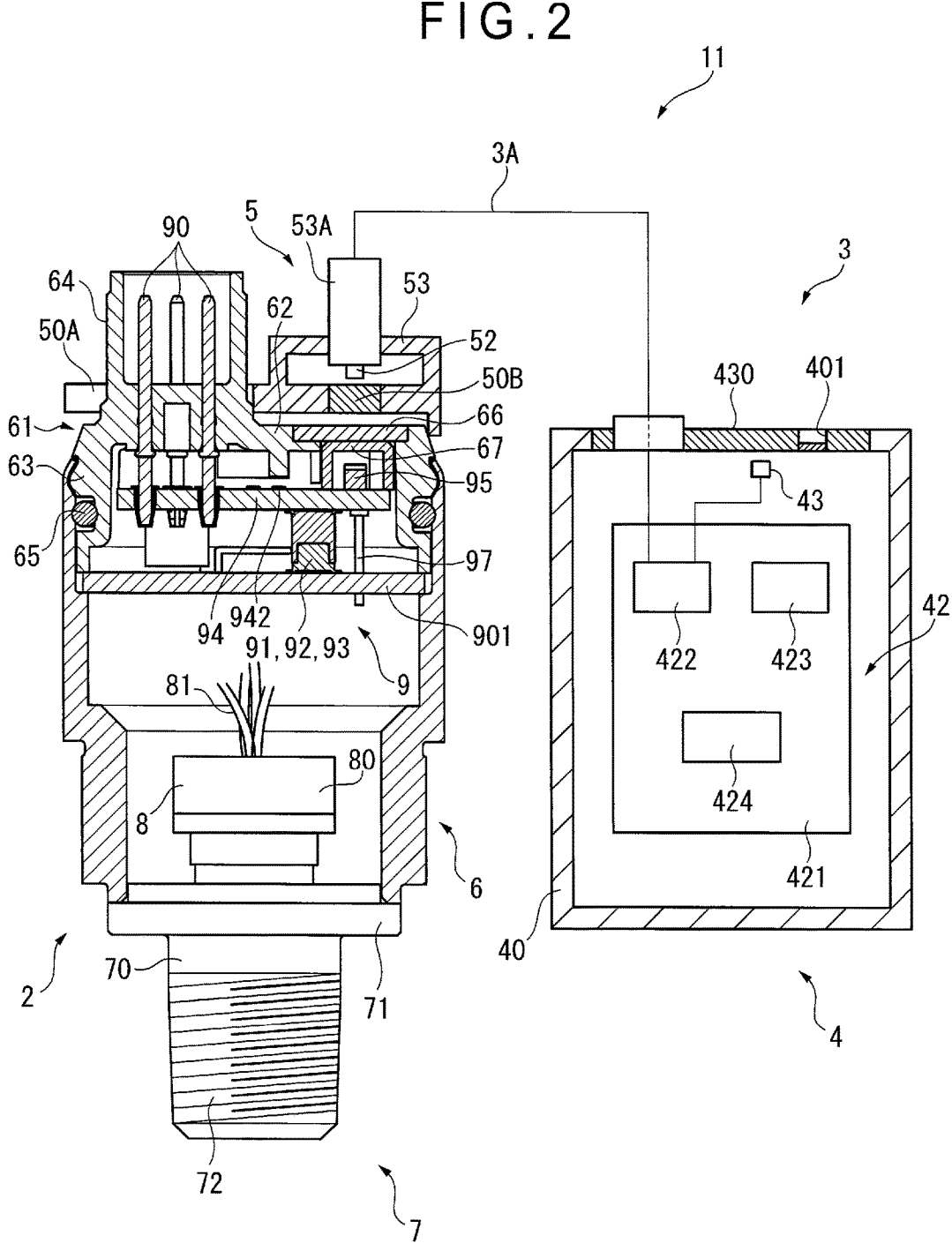
FIG. 2 is a cross section showing the physical quantity measuring device.

An overall arrangement of a physical quantity measuring device according to the first exemplary embodiment is shown in FIGS. 1 and 2.

As shown in FIGS. 1 and 2, a physical quantity measuring device 11 includes a measuring device body 2 and a controller 3 attachable to the measuring device body 2. A plurality of measuring device bodies 2 are shown in FIG. 1 in the first exemplary embodiment, and the controller 3 is connected to one of the plurality of measuring device bodies 2.

The measuring device body 2 is a pressure measuring device configured to measure a pressure of a target fluid and transmit the measured pressure data to an outside through a cable 2A.

The controller 3 includes a controller body 4, a communication attachment member 5 configured to be detachably attached to the measuring device body 2, a second light emitter/receiver 52 provided to the communication attachment member 5 and a cord 3A connectable with the controller body 4 and the communication attachment member 5. The cord 3A is detachable from the controller body 4.

FIGS. 3 to 6 show the measuring device body 2.

Figure 3:
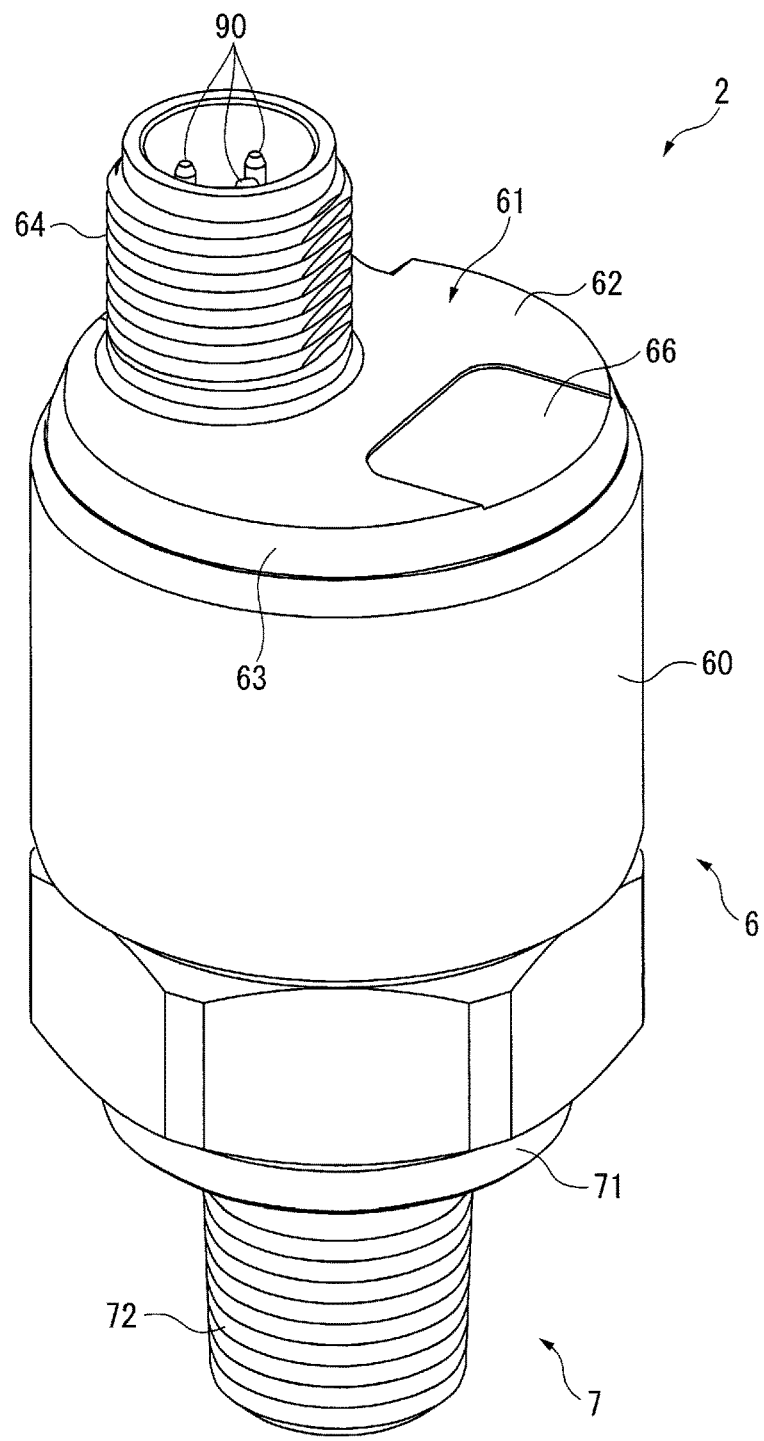
FIG. 3 is a perspective view showing an overall arrangement of the measuring device body.

FIG. 3 shows an overall arrangement of the measuring device body 2.

As shown in FIGS. 2 and 3, the measuring device body 2 includes a housing 6, a joint 7 provided at an end of the housing 6, a detector 8 provided to the joint 7 and an electronic device 9 provided inside the housing 6.

The housing 6 includes a cylindrical case 60 and a cover unit 61 provided to a first open end of the cylindrical case 60. The detector 8 is disposed near a second open end of the cylindrical case 60.

The cover unit 61 includes a disc-shaped plate 62, a locking portion 63 annularly formed on an outer peripheral edge of the plate 62 and a cylindrical portion 64 provided on the plate 62. An O-ring 65 is interposed between the locking portion 63 and the cylindrical case 60.

A plurality of connection pins 90 penetrate through the plate 62. The connection pins 90 serve as terminals. The connection pins 90 are surrounded by the cylindrical portion 64. The cable 2A is connected to an exposed portion of the cylindrical portion 64.

A window 66 that transmits infrared rays is hermetically provided to the plate 62. The window 66 is made of an infrared-transparent material.

The joint 7 includes a shaft 70 provided therein with a hole (not shown) for a target fluid to flow and a flange 71 provided to the shaft 70 near the housing 6.

A male thread 72 used for attaching the measuring device body 2 to a target member (not shown) is provided to the shaft 70.

The detector 8 includes a bottomed cylindrical sensor module 80. The detector 8 is configured to detect a pressure of the target fluid flowing through the hole of the joint 7 toward a recess (not shown) of the sensor module 80.

A strain gauge (not shown) is provided to a face of the sensor module 80 opposite the recess. The strain gauge and the electronic device 9 are electrically connected to each other through a cable 81.

Figure 4:
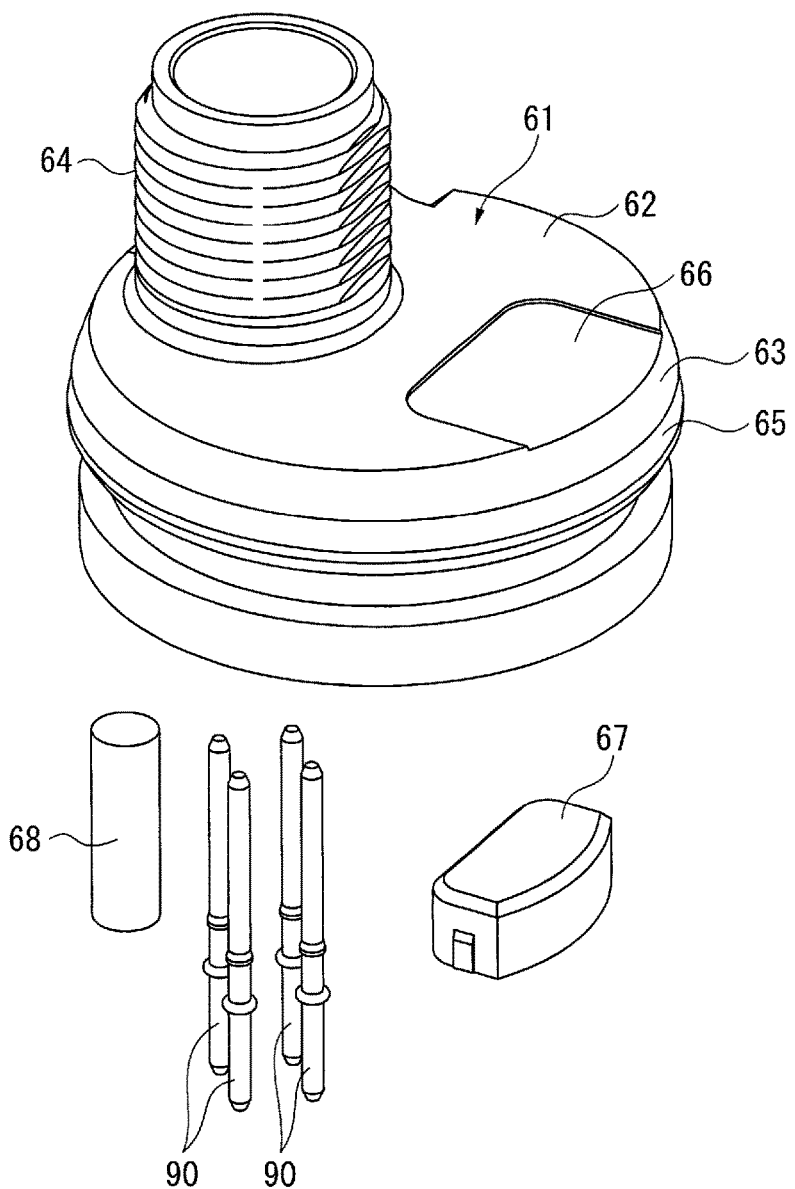
FIG. 4 is an exploded perspective view showing components of the measuring device body at a first side thereof.
Figure 5:
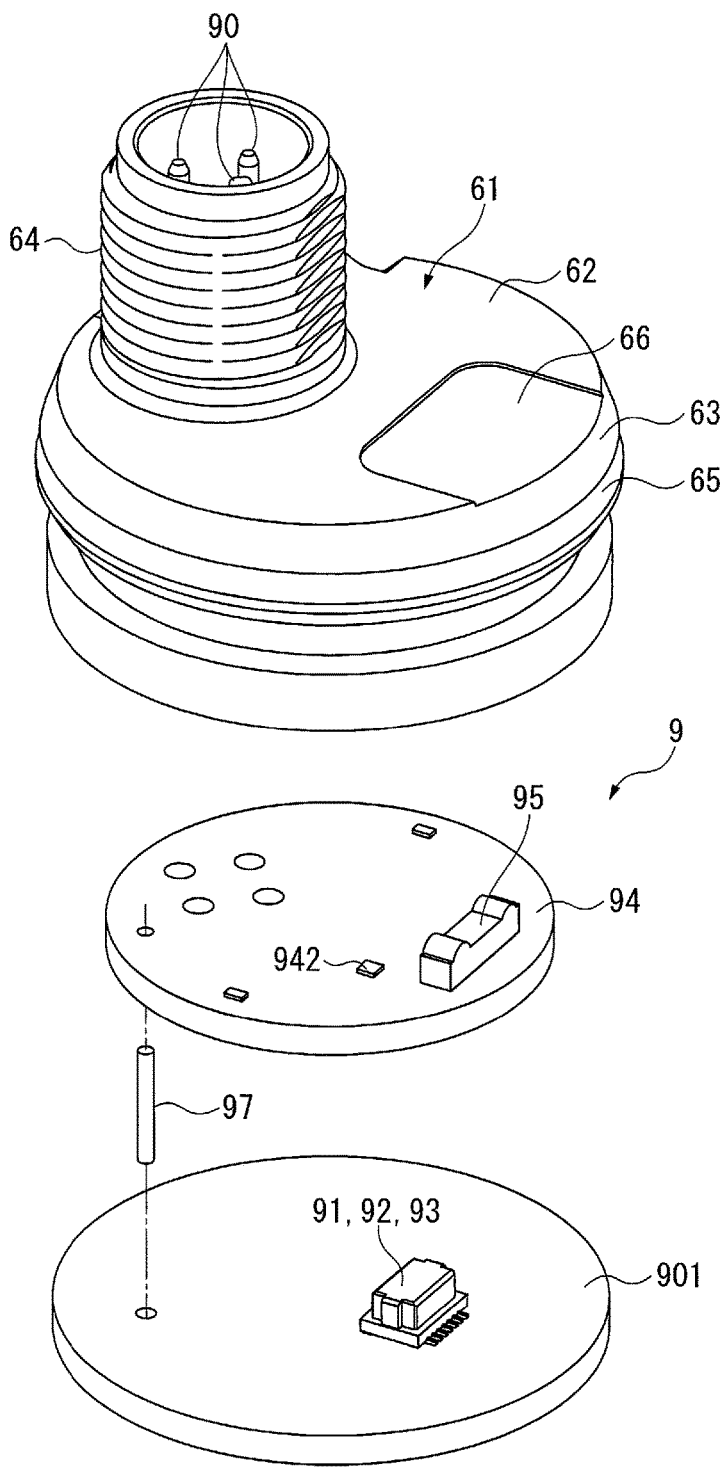
FIG. 5 is an exploded perspective view showing an area of the measuring device body from the first side to a central part.
Figure 6:
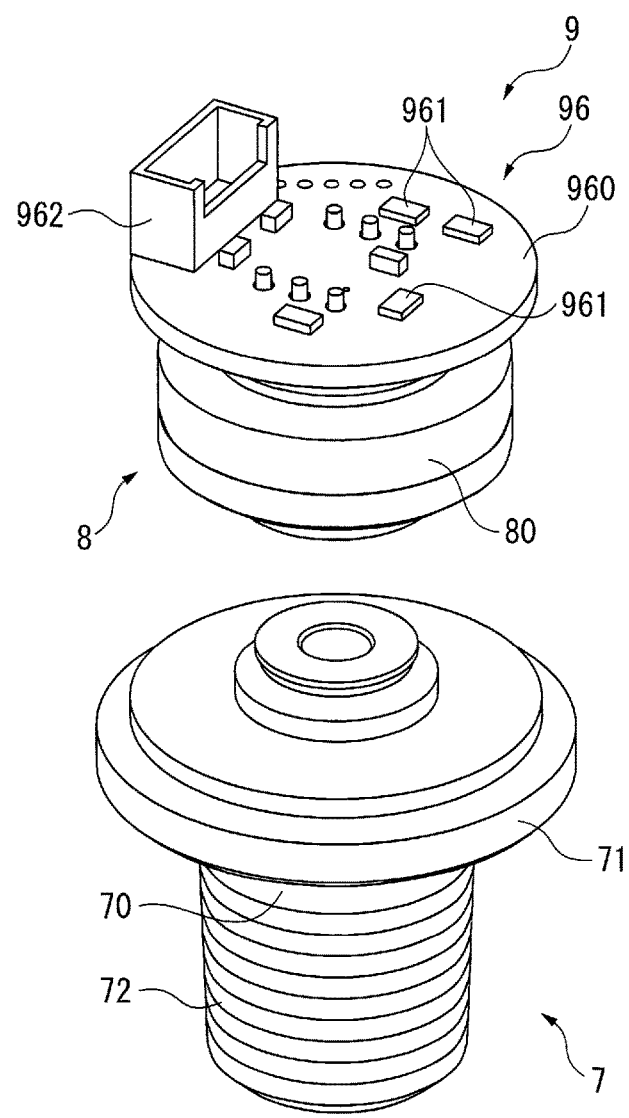
FIG. 6 is an exploded perspective view showing components of the measuring device body at a second side thereof.

FIGS. 4 to 6 show the interior structure of the measuring device body.

As shown in FIGS. 2, 4, 5 and 6, the electronic device 9 includes an electronic circuit unit 91 configured to receive the signals detected by the detector 8, an electronic calibration unit 92 configured to calibrate the electronic circuit unit 91, a first control unit 93 configured to control an external signal, a signal transmission unit 94 electrically connected to the first control unit 93, a first light emitter/receiver 95 provided to the signal transmission unit 94 and configured to receive an external infrared signal or transmit an infrared signal to the outside and a temperature correction circuit 96. These units are electrically connected with each other.

The electronic calibration unit 92 is configured to perform a zero point calibration, a contact point output setting or the like of the electronic circuit unit 91, and is actuated in response to a command from the first control unit 93. The setting values of the zero point calibration, the contact point output setting and the like vary depending on the model of the measuring device body 2.

As shown in FIG. 5, the electronic circuit unit 91, the electronic calibration unit 92 and the first control unit 93 are provided on a first circuit board 901. The first light emitter/receiver 95 is a device that receives or emits infrared ray in the same manner as the second light emitter/receiver 52, which is actuated in response to a signal from the first control unit 93.

The first circuit board 901 includes a plate-shaped substrate body and a circuit pattern (not shown) printed on the substrate body. In the first exemplary embodiment, the electronic circuit unit 91, the electronic calibration unit 92 and the first control unit 93 may be provided by a single electronic component as shown in FIG. 5, or alternatively, may be provided by independent electronic components.

The signal transmission unit 94 is a disc-shaped circuit board facing the first circuit board 901. The signal transmission unit 94 includes the first light emitter/receiver 95 and a measuring-device-side signal checker 942 provided on a face opposite the face facing the first circuit board 901.

The first circuit board 901 and the signal transmission unit 94 are connected to each other via a metallic pin 97. The pin 97 serves as a spacer for the signal transmission unit 94 and the first circuit board 901.

As shown in FIG. 6, the temperature correction circuit 96 includes a disc-shaped substrate body 960 and a plurality of electron devices 961 provided on the substrate body 960. The temperature correction circuit 96 applies a temperature correction on the signals detected by the detector 8.

The substrate body 960 is provided with a receiver 962 for receiving the cable 81.

It should be noted that the temperature correction circuit 96 is not shown in FIG. 2.

As shown in FIGS. 2 and 4, the window 66 and the first light emitter/receiver 95 face each other with an Ir filter 67 being interposed therebetween.

The Ir filter 67 is a filter configured to transmit only infrared rays and block visible rays. In the first exemplary embodiment, the Ir filter 67 is configured to cover lateral and upper part of the first light emitter/receiver 95.

It should be noted that the member indicated by a sign 68 in FIG. 4 is an atmosphere introduction filter that is only used for a low-pressure measurement.

Figure 7:
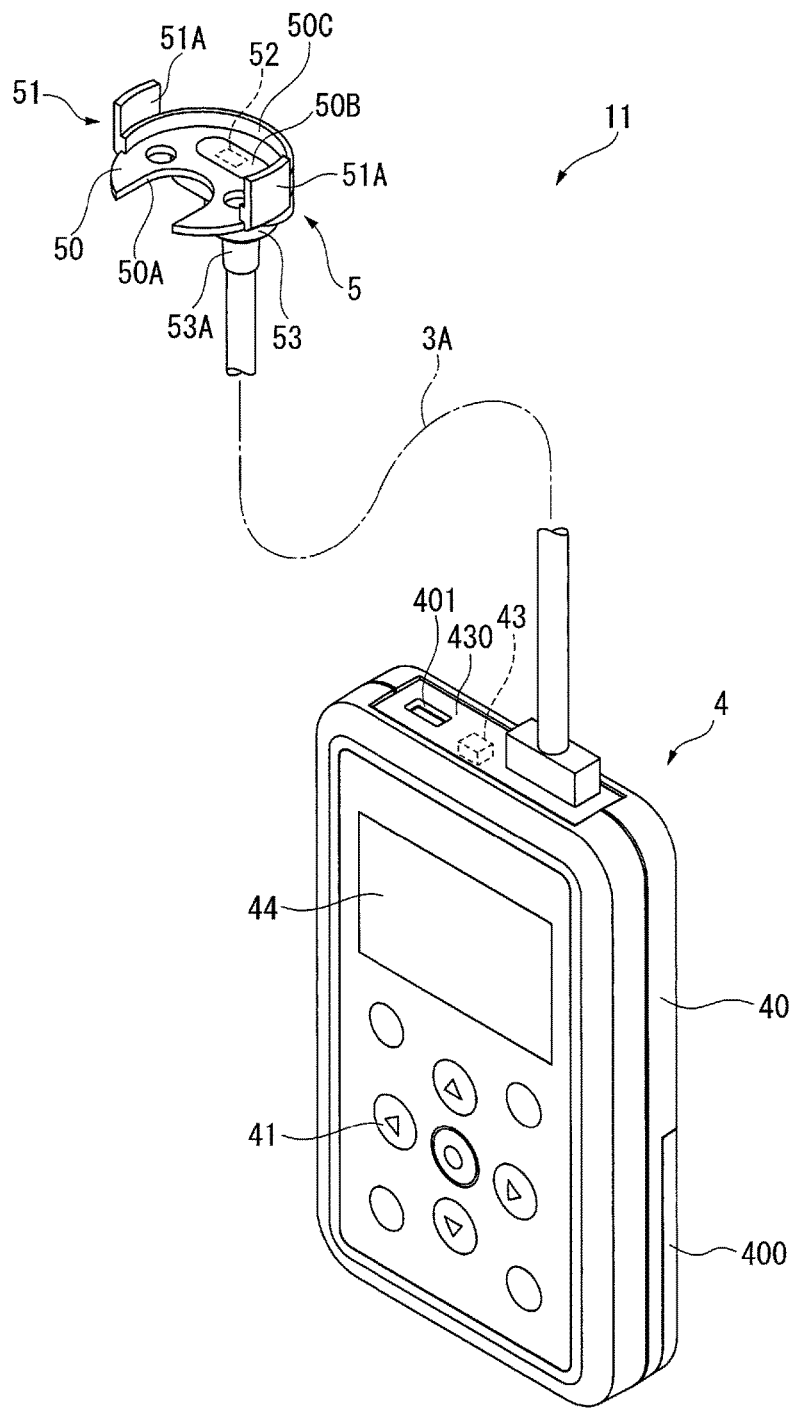
FIG. 7 is a perspective view showing a controller.

FIG. 7 shows an overall arrangement of the controller 3.

As shown in FIGS. 1, 2 and 7, the controller body 4 includes a case 40, an operation unit 41 disposed at a front side of the case 40, a circuit 42 provided inside the case 40, a third light emitter/receiver 43 provided inside the case 40 and a display 44 provided at the front side of the case 40 adjacent to the operation unit 41.

The third light emitter/receiver 43 is a component independent of the second light emitter/receiver 52 and, as described later, the third light emitter/receiver 43 and the second light emitter/receiver 52 are selectively used. A window 430 is hermetically provided on an upper side of the case 40 in a manner facing the third light emitter/receiver 43. It should be noted that the sign 401 in FIGS. 2 and 7 denotes a slot for a USB memory.

A battery housing box (not shown) is provided to the case 40. The battery housing box is covered with a battery cover 400.

The operation unit 41 is configured to operate the electronic calibration unit 92 and to call up the measurement data including the pressure value detected by the detector 8 from the measuring device body 2. The operation unit 41 is provided with a plurality of keys.

The circuit 42 includes a circuit board 421, and a second controller 422, a controller-side signal checker 423 and a storage 424 provided on the circuit board 421. The storage 424 stores the setting value of the electronic calibration unit 92 of the measuring device body 2 for each model of the devices. It should be noted that, in the first exemplary embodiment, the setting value of the electronic calibration unit 92 for each model of the devices may be stored in an external electronic device (e.g. a personal computer and a USB memory), and the electronic device such as a personal computer may be connected to the controller body 4 to read the information on the setting value in calibrating the electronic circuit unit 91.

The second controller 422 is configured to switch the second light emitter/receiver 52 and the third light emitter/receiver 43 in response to signals from the operation unit 41. Specifically, the second controller 422 is configured to receive the signals from one of the second light emitter/receiver 52 and the third light emitter/receiver 43 and send signals to the one of the second light emitter/receiver 52 and the third light emitter/receiver 43. The second controller 422 is also configured to call up the setting value corresponding to the model of the measuring device body 2 from the storage 424 in response to the signals from the operation unit 41 and to cause the first control unit 93 of the model of the measuring device body 2 to actuate the electronic calibration unit 92.

The controller-side signal checker 423 is a device that is configured to check, in conjunction with the measuring-device-side signal checker 942 provided to the signal transmission unit 94, that the signal transmission/reception between the measuring device body 2 and the controller 3 is available.

Specifically, when infrared pulse signals are transmitted from one of the second light emitter/receiver 52 and the third light emitter/receiver 43 through the controller-side signal checker 423 to the first light emitter/receiver 95 to be received thereby, the measuring-device-side signal checker 942 counts the number of the pulse signals. The number of received pulse signals counted by the measuring-device-side signal checker 942 is sent from the first light emitter/receiver 95 to one of the second light emitter/receiver 52 and the third light emitter/receiver 43 to be received by the second controller 422. The second controller 422 judges whether or not the number of the transmitted pulse signals coincides with the number of the received pulse signals and, when the number of the transmitted pulse signals and the number of the received pulse signals are the same, the second controller 422 displays on the display 44 that the communication environment is favorable. The favorable communication environment is indicated by, for instance, displaying "OK" or lighting blue light.

The display 44 is configured to display the data including the model of the measuring device body 2, the setting value to be commanded to the electronic calibration unit 92 and the measurement value detected by the detector 8. It should be noted that the information displayed on the display 44 through the third light emitter/receiver 43 may be the same as the information displayed on the display 44 through the second light emitter/receiver 52 or may be different from the information displayed through the second light emitter/receiver 52. For instance, only the measurement value may be displayed on the display 44 through the third light emitter/receiver 43.

The communication attachment member 5 includes a cover 50 provided with the second light emitter/receiver 52, an engagement portion 51 integrally provided to the cover 50 to be engaged with the plate 62 of the housing 6 and a step 53 integrally provided to the cover 50. When the communication attachment member 5 is attached to the housing 6, the second light emitter/receiver 52 faces the window 66 of the housing 6.

The cover 50 is a substantially disc-shaped member and is provided at a part thereof with a recess 50A whose inner surface is configured to be in contact with a part of the outer circumference of the cylindrical portion 64. A projection 50C guided by an outer circumference of cover unit 61 is provided on an outer peripheral edge of the cover 50. In the first exemplary embodiment, the projection 50C is in a form of an arc.

A window 50B is provided to a portion of the cover 50 facing the second light emitter/receiver 52. The window 50B is made of an infrared-transparent material.

The engagement portion 51 includes a pair of engagement pieces 51A facing across the center of the cover 50. The engagement pieces 51A are held by an outer circumference of the housing 6.

The step 53 covers the second light emitter/receiver 52 and receives a terminal 53A electrically connected with the second light emitter/receiver 52. The terminal 53A is connected to the cord 3A.

In order to perform the zero point calibration and the like of the electronic circuit unit 91 in the physical quantity measuring device 11 according to the first exemplary embodiment, the communication attachment member 5 is initially attached to the housing 6 of the measuring device body 2. In this state, the window 66 of the measuring device body 2 faces the window 50B of the communication attachment member 5, and the first light emitter/receiver 95 and the second light emitter/receiver 52 are positioned with the windows 50B, 66 interposed therebetween.

Subsequently, the operation unit 41 is operated to select the second light emitter/receiver 52, where it is checked whether the infrared signal transmission/reception between the measuring device body 2 and the controller 3 through the second light emitter/receiver 52 and the first light emitter/receiver 95 is enabled.

When it is confirmed that the signal transmission/reception between the measuring device body 2 and the controller 3 is enabled, the calibration and setting operations (e.g. the zero point calibration of the electronic circuit unit 91) are performed through the controller body 4.

In order to perform the calibration and setting operations, the second controller 422 reads the model information of the measuring device body 2 to be calibrated and sends signals to the electronic calibration unit 92 so that the setting values in accordance with the model of the measuring device body 2 are set.

When the calibration and setting operations of the electronic circuit unit 91 are completed, the communication attachment member 5 is detached from the measuring device body 2 to perform a normal pressure measurement.

Next, description will be made on an arrangement in which the electronic circuit unit 91 is calibrated and set through the third light emitter/receiver 43 of the controller body 4 while the cord 3A is detached from the controller body 4 with reference to FIG. 8. It should be noted that the temperature correction circuit 96 is not shown in FIG. 8.

Figure 8:
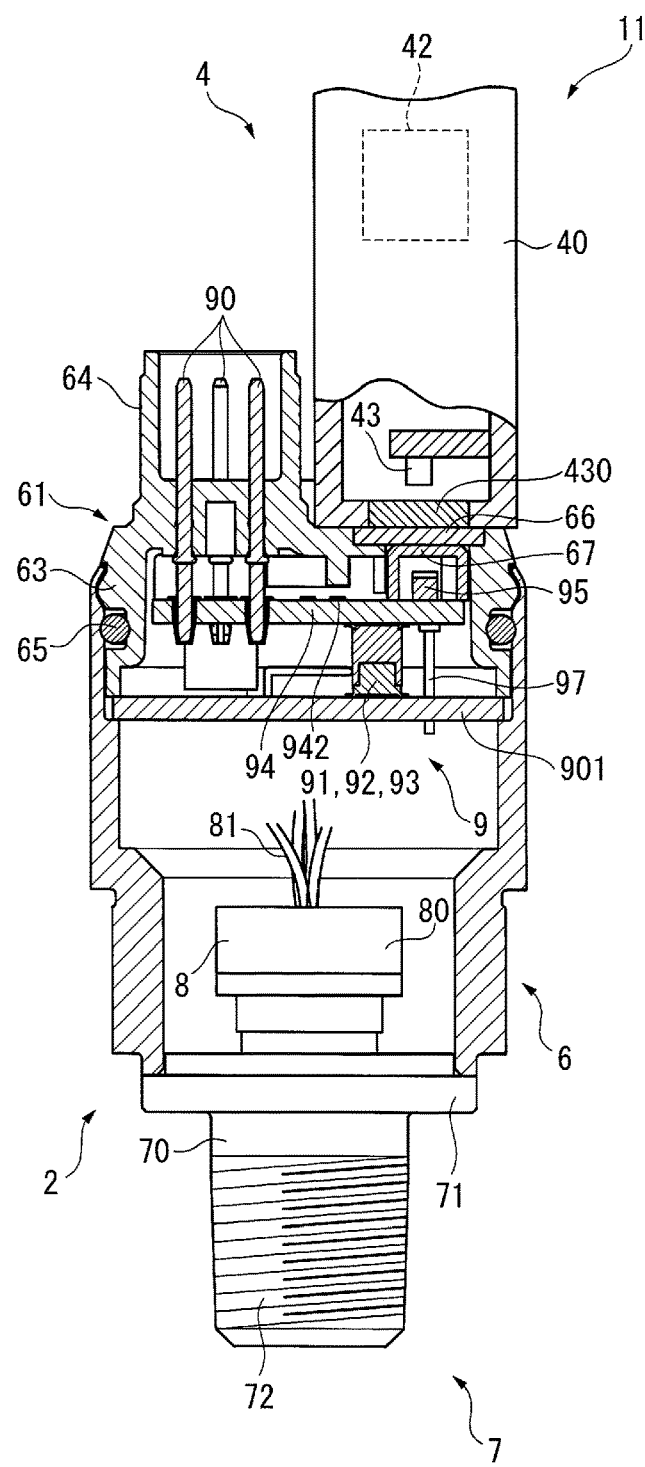
FIG. 8 is a cross section showing a use of a controller body different from that shown in FIG. 2.

As shown in FIG. 8, the controller body 4 is held so that the window 430 faces the window 66 of the measuring device body 2. Subsequently, the operation unit 41 is operated to select the third light emitter/receiver 43 and it is checked whether the infrared signal transmission/reception between the measuring device body 2 and the controller 3 through the third light emitter/receiver 43 and the first light emitter/receiver 95 is enabled. Further, the calibration and setting operations including the zero point calibration of the electronic circuit unit 91 are performed using the controller body 4.

The first exemplary embodiment offers the following advantages.

(1) The controller 3 includes the communication attachment member 5 detachably attached to the measuring device body 2, the second light emitter/receiver 52 provided to the communication attachment member 5 and configured to send/receive signals to/from the first light emitter/receiver 95 of the measuring device body 2, and the second controller 422 configured to send/receive signals to/from the second light emitter/receiver 52, and the electronic circuit unit 91, the electronic calibration unit 92, the first control unit 93, the signal transmission unit 94 and the first light emitter/receiver 95 are provided inside the housing 6 of the measuring device body 2. Accordingly, the signals from the controller 3 are transmitted through the second controller 422 to the second light emitter/receiver 52 of the communication attachment member 5, and the signals are transmitted to be processed by the electronic calibration unit 92 through the signal transmission unit 94 and the first control unit 93 of the measuring device body 2. Thus, the setting of the electronic circuit unit 91 and the like can be easily made without using a tool such as a screwdriver.

(2) The window 66 is hermetically provided to the plate 62 of the measuring device body 2 and the communication attachment member 5 includes the cover 50 capable of being mounted so that the second light emitter/receiver 52 faces the window 66 and the engagement portion 51 provided to the cover 50 and configured to be engaged with the housing 6. Accordingly, when the engagement portion 51 engages with the housing 6, the first light emitter/receiver 95 and the second light emitter/receiver 52 are opposed to each other, thereby eliminating disturbance undesirable for the communication. Further, since the window 66 is hermetically provided to the plate 62, a water-proof structure can be simply provided.

(3) Since the signals transmitted/received between the first light emitter/receiver 95 and the second light emitter/receiver 52 are infrared signals, the above-described advantages can be achieved with a simple structure using the infrared rays.

(4) Since the measuring-device-side signal checker 942 and the controller-side signal checker 423 configured to check the signal transmission/reception between the measuring device body 2 and the controller 3 are provided, the communication environment can be reliably checked by flashing the infrared rays to generate the pulse signals and checking the number of pulses.

(5) Since the controller 3 includes the controller body 4 provided with the second controller 422 and the cord 3A connected to the controller body 4 and the communication attachment member 5, the calibration and the like of the electronic calibration unit 92 can be done even when the measuring device body 2 is located away from an operator.

(6) The cord 3A is detachable from the controller body 4 and the controller body 4 includes the third light emitter/receiver 43. Thus, since the third light emitter/receiver 43 of the controller body 4 is capable of direct transmission/reception of signals to/from the first light emitter/receiver 95 of the measuring device body 2, it is not necessary to attach the communication attachment member 5 to the measuring device body 2.

(7) Since the controller body 4 includes the display 44 and the measurement value is displayed on the display 44, the operator can read the measurement values using the controller body 4 at hand.

(8) The plate 62 is provided with the connection pins 90 connected with the signal transmission unit 94 and the cylindrical portion 64 surrounding the connection pins 90. The cover 50 is provided with the recess 50A in contact with the outer circumference of the cylindrical portion 64 and the cover 50 is located on the outer circumference of the cylindrical portion 64 using the recess 50A. Accordingly, the communication attachment member 5 can be accurately positioned to the measuring device body 2.

(9) The engagement portion 51 includes the pair of mutually opposed engagement pieces 51A. Accordingly, the communication attachment member 5 can be easily attached to and stably supported by the measuring device body 2.

Second Exemplary Embodiment

Next, a second exemplary embodiment of the invention will be described below with reference to FIG. 9.

A physical quantity measuring device 12 according to the second exemplary embodiment differs from that of the first exemplary embodiment in the arrangement of the controller and the arrangement of the measuring device body 2 is the same as that in the first exemplary embodiment. It should be noted that the same components as those in the first exemplary embodiment will be denoted using the same signs in the description of the second exemplary embodiment to omit the explanation thereof.

Figure 9:
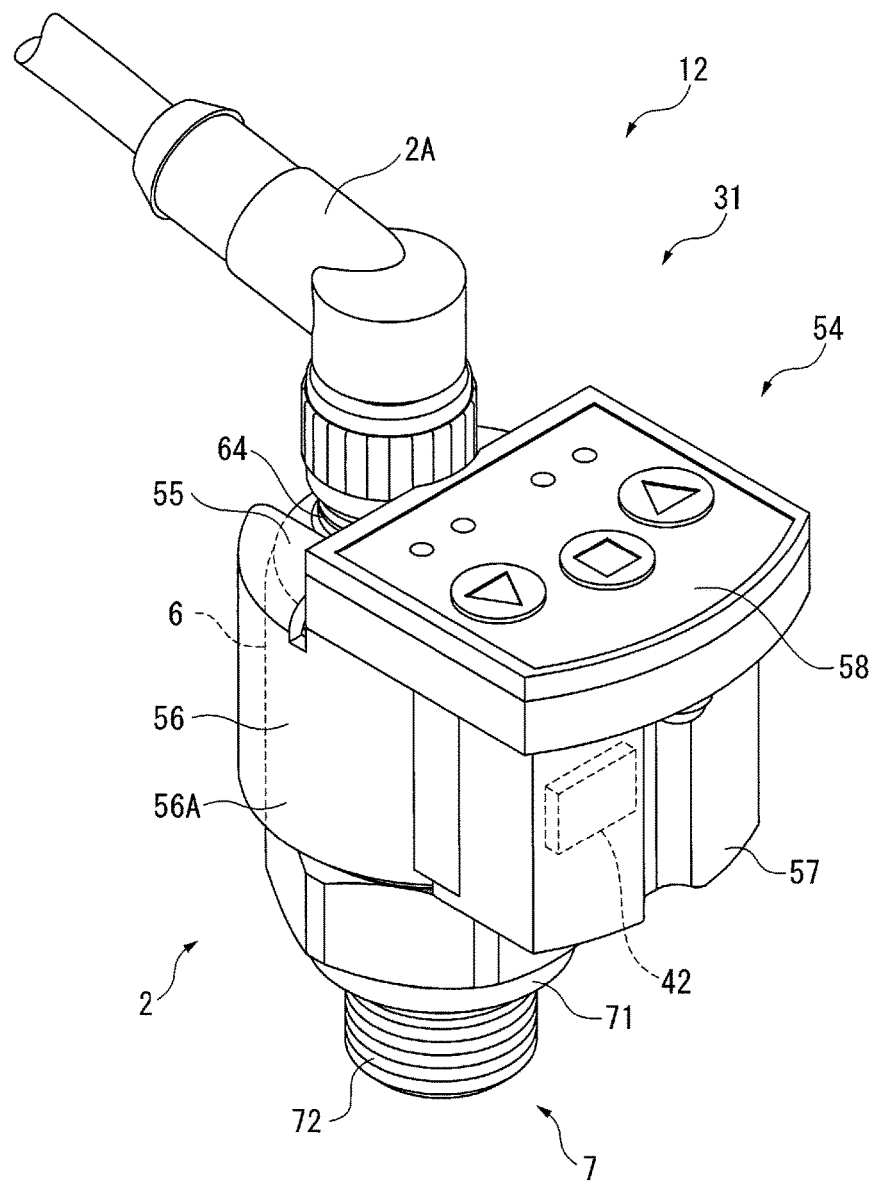
FIG. 9 is a perspective view showing a communication attachment member according to a second exemplary embodiment of the invention.

As shown in FIG. 9, the physical quantity measuring device 12 includes the measuring device body 2 and a controller 31 attached to the measuring device body 2.

The controller 31 includes a communication attachment member 54 detachably attached to the measuring device body 2.

The communication attachment member 54 includes a cover 55 provided with a second light emitter/receiver (not shown), a casing 57 integrally provided to the cover 55 and an operation unit 58 provided to the casing 57.

The cover 55 is provided at a part thereof with a recess (not shown) whose inner surface is to be in contact with a part of an outer circumference of the cylindrical portion 64.

The casing 57 includes an engagement portion 56 to be engaged with the housing 6. The engagement portion 56 includes a pair of engagement pieces 56A that face each other across the center of the cover 55 and are held on an outer circumference of the housing 6 along an axial direction of the housing 6.

A circuit 42 is provided inside the casing 57.

The operation unit 58 is disposed to face upward. The operation unit 58 may have the same function as that of the operation unit 41 in the first exemplary embodiment or may have different function(s). Specifically, the operation unit 58 may be configured to operate the electronic calibration unit 92 and to call up the measurement data including the pressure value detected by the detector 8 from the measuring device body 2, or alternatively, may be configured to solely call up the measurement data including the pressure value detected by the detector 8 from the measuring device body 2. In this case, the electronic calibration unit is not necessary.

The circuit 42 may be connected with a personal computer (not shown) to provide the same function as that of the display 44 in the first exemplary embodiment to the personal computer.

The second exemplary embodiment offers the following advantage in addition to the same advantages as those in (1)-(4), (8) and (9) of the first exemplary embodiment. (10) Since the circuit 42, which is housed in the controller body 4 in the first exemplary embodiment, is housed in the communication attachment member 54 in the second exemplary embodiment, only a single primary component is necessary, whereby the management of the device can be facilitated.

Third Exemplary Embodiment

Next, a third exemplary embodiment of the invention will be described below with reference to FIGS. 10 to 12. It should be noted that the temperature correction circuit 96 is not shown in FIG. 10.

A physical quantity measuring device 13 according to the third exemplary embodiment differs from that of the first exemplary embodiment in the arrangement of the controller and the arrangement of the measuring device body 2 is the same as that in the first exemplary embodiment. It should be noted that the same components as those in the first exemplary embodiment will be denoted using the same signs in the description of the third exemplary embodiment to omit the explanation thereof.

Figure 10:
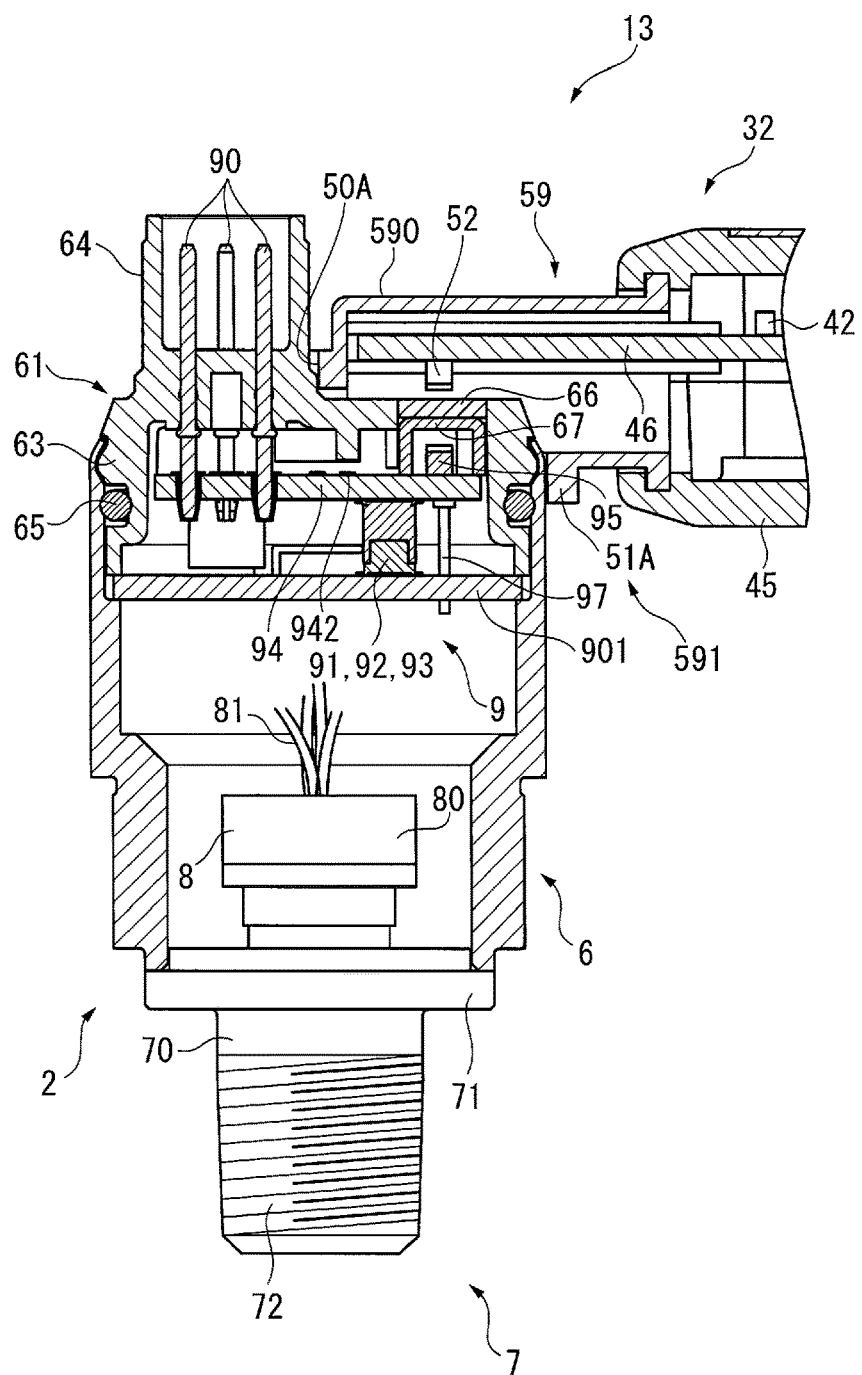
FIG. 10 is a cross section showing a physical quantity measuring device according to a third exemplary embodiment of the invention.
Figure 11:
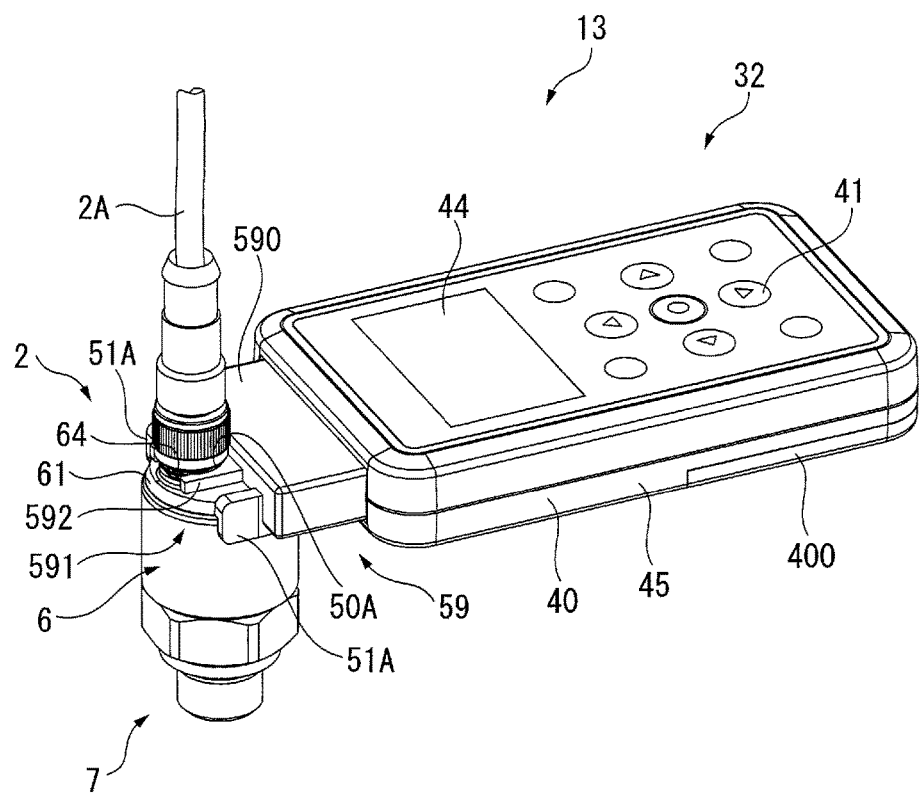
FIG. 11 is a perspective view showing the physical quantity measuring device according to the third exemplary embodiment.

As shown in FIGS. 10 and 11, the physical quantity measuring device 13 includes the measuring device body 2 and a controller 32 attached to the measuring device body 2.

The controller 32 is an integrated component of a controller body 45 and a communication attachment member 59 and the cord 3A in the above first and second exemplary embodiments is not provided.

The controller body 45 includes the case 40 housing a circuit (not shown), and the operation unit 41 and the display 44 provided to the case 40.

The communication attachment member 59 includes a cover 590 housing the second light emitter/receiver 52 therein and an engagement portion 591 integrated with the cover 590.

An end of the circuit board 46 projecting from an opening at a first end of the case 40 is exposed through a portion of the cover 590. The second light emitter/receiver 52 is attached to the exposed portion of the circuit board 46. The second light emitter/receiver 52 is electrically connected with the circuit 42 provided near a second end of the circuit board 46.

A lower part of the cover 590 is cut so that an outer circumference of the cylindrical case 60 is capable of being engaged with the cut portion of the cover 590.

The engagement portion 591 includes a first engagement piece 51A integrally provided to the cut portion of the cover 590, and second and third engagement pieces 51A projecting from a distal end of the cover 590 (see FIG. 12), inner circumference of each of the engagement pieces 51A being in contact with the outer circumference of the cylindrical case 60. It should be noted that, though the engagement portion 591 may be provided by three engagement pieces 51A independently provided to the cover 590, the engagement portion 591 may alternatively be provided by a single arc-shaped component connecting the three engagement pieces 51A.

The cover 590 has a projection 592 projecting from a center of an end of the cover 590. The projection 592 is provided with the recess 50A configured to be in contact with the outer circumference of the cylindrical portion 64.

Figure 12:
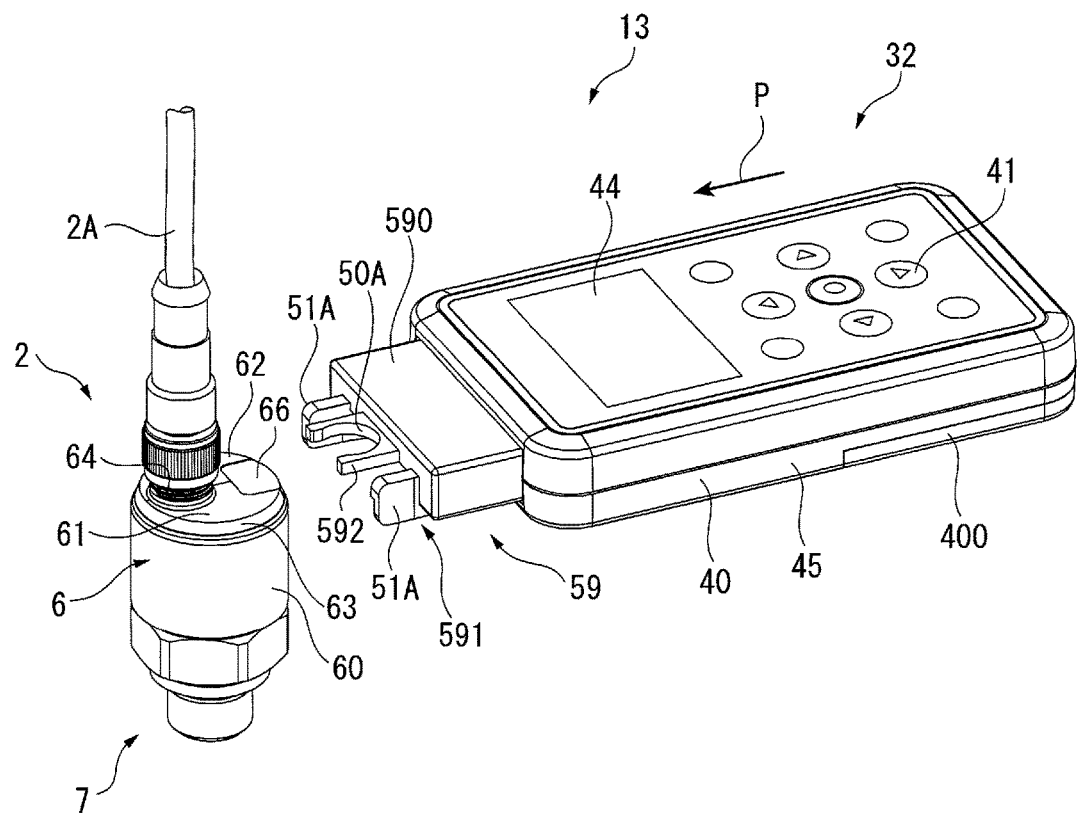
FIG. 12 is a perspective view showing the physical quantity measuring device according to the third exemplary embodiment before a communication attachment member is attached to a measuring device body.

In the third exemplary embodiment as structured above, the controller body 45 is inserted to measuring device body 2 so that the recess 50A is in contact with the outer circumference of the cylindrical portion 64 as shown in FIG. 12 (see an arrow P). When the controller body 45 is inserted to the measuring device body 2, since the recess 50A and the engagement pieces 51A are engaged with the housing 6, the second light emitter/receiver 52 is aligned with the first light emitter/receiver 95.

The third exemplary embodiment offers the following advantage in addition to the same advantages as those in (1)-(4) and (7) of the first exemplary embodiment.

(11) Since the controller body 45 and the communication attachment member 59 are integrated, the cord 3A for connecting the controller body 45 and the communication attachment member 59 is no more required, so that the setting of the electronic circuit unit 91 can be facilitated.

Incidentally, it should be understood that the scope of the present invention is not limited to the above-described exemplary embodiments but includes modifications and improvements as long as the modifications and improvements are compatible with an object of the invention.

Figure 13:
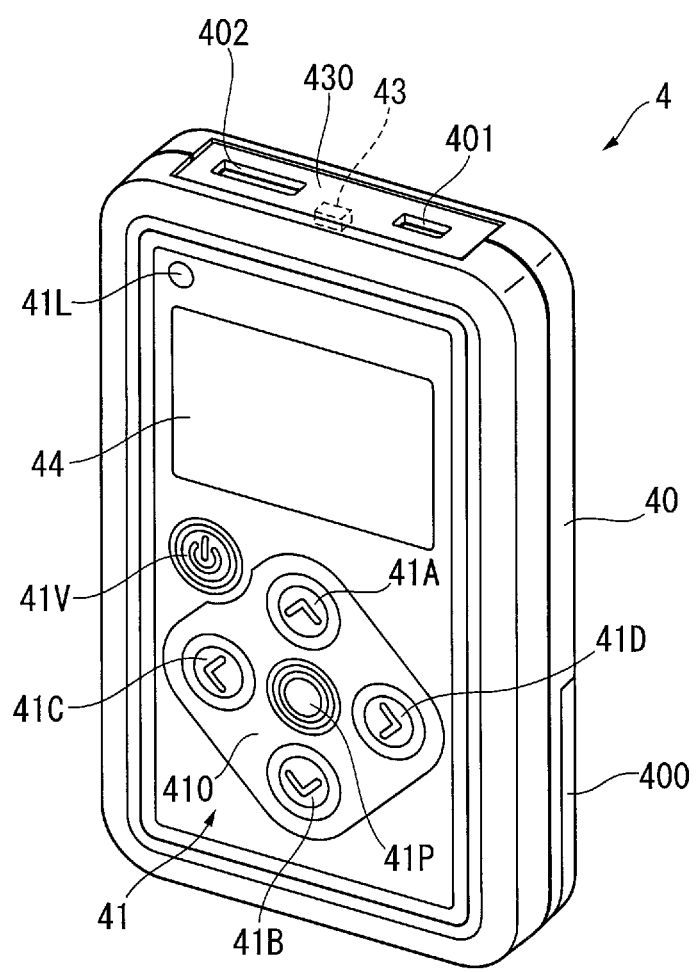
FIG. 13 is a perspective view showing a controller body according to a modification of the invention.

The arrangement of the controller body 4 of the invention is not limited to those described in the above exemplary embodiments. For instance, as shown in FIG. 13, the operation unit 41 of the controller body 4 may include: a rectangular area 410 differently colored from the other portion and disposed at a front side of the case 40; a determination button 41P disposed at the center of the rectangular area 410; and cursor keys 41A, 41B, 41C and 41D surrounding the determination button 41P, the cursor keys 41A, 41B, 41C and 41D respectively indicating up, down, left and right directions. A power button 41V may be disposed diagonally above the determination button 41P at a position adjacent to the rectangular area 410. The operation of the operation unit 41 can be facilitated by the above disposition of the buttons and keys. Further, a battery-charge LED 41L indicating battery charging status is disposed above the display 44 on the front side of the case 40.

It should be noted that the power button 41V may be disposed diagonally right above the determination button 41P.

In FIG. 13, the reference numeral 402 denotes a connector for connecting the cord 3A, an infrared extension cable or other cable.

Further, though the target to be detected by the detector 8 in the above-described exemplary embodiments is the pressure of the target fluid, the target to be measured in the invention is not limited to pressure but may be a physical quantity other than pressure including differential pressure and temperature.

The signals transmitted/received between the first light emitter/receiver 95 and the second light emitter/receiver 52 are not limited to infrared signals. Even when infrared signals are used, it is not requisite to provide the measuring-device-side signal checker 942 and the controller-side signal checker 423.

What is claimed is:
1. A physical quantity measuring device comprising:
a measuring device body comprising:
    a housing comprising a cylindrical case;
    a plate provided at a first open end of the cylindrical case;
    a detector provided to a second open end of the cylindrical case and configured to detect a physical quantity of a target fluid;
    an electronic circuit unit configured to receive a signal detected by the detector;
    an electronic calibration unit configured to calibrate the electronic circuit unit;
    a first control unit configured to control an external signal;
    a signal transmission unit electrically connected to the first control unit; and
    a first light emitter/receiver provided to the signal transmission unit and configured to receive and send the external signal; and
a controller comprising:

a communication attachment member configured to be detachably attached to the measuring device body;
a second light emitter/receiver attached to the communication attachment member and configured to receive the signal from the first light emitter/receiver and send the signal to the first light emitter/receiver; and
a second controller configured to receive the signal from the second light emitter/receiver and send the signal to the second light emitter/receiver, wherein
a window that is configured to allow transmission/reception of the signal between the first light emitter/receiver and the second light emitter/receiver is hermetically provided to the plate,
the electronic circuit unit, the electronic calibration unit, the first control unit, the signal transmission unit and the first light emitter/receiver are provided inside the housing,
the communication attachment member comprises a cover configured to be disposed so that the second light emitter/receiver faces the window and an engagement portion provided to the cover to be engageable with the housing,
the plate comprises a cylindrical portion, and
the cover comprises a recess configured to be in contact with an outer circumference of the cylindrical portion.

2. The physical quantity measuring device according to claim 1, further comprising:
a signal checker configured to check transmission/reception of the signal between the measuring device body and the controller, wherein
the signal transmitted/received between the first light emitter/receiver and the second light emitter/receiver is an infrared signal.

3. The physical quantity measuring device according to claim 1, wherein
the controller comprises:
a controller body provided with the second controller; and
a cord connected to the controller body and the communication attachment member, the cord allowing the transmission/reception of the signal between the second controller and the second light emitter/receiver.

4. A physical quantity measuring device comprising:
a measuring device body comprising:
a housing comprising a cylindrical case;
a plate provided at a first open end of the cylindrical case;
a detector provided to a second open end of the cylindrical case and configured to detect a physical quantity of a target fluid;
an electronic circuit unit configured to receive a signal detected by the detector;
an electronic calibration unit configured to calibrate the electronic circuit unit;
a first control unit configured to control an external signal;
a signal transmission unit electrically connected to the first control unit; and
a first light emitter/receiver provided to the signal transmission unit and configured to receive and send the external signal; and
a controller comprising:
a communication attachment member configured to be detachably attached to the measuring device body;
a second light emitter/receiver attached to the communication attachment member and configured to receive the signal from the first light emitter/receiver and send the signal to the first light emitter/receiver; and
a second controller configured to receive the signal from the second light emitter/receiver and send the signal to the second light emitter/receiver, wherein
a window that is configured to allow transmission/reception of the signal between the first light emitter/receiver and the second light emitter/receiver is hermetically provided to the plate,
the electronic circuit unit, the electronic calibration unit, the first control unit, the signal transmission unit and the first light emitter/receiver are provided inside the housing,
the communication attachment member comprises a cover configured to be disposed so that the second light emitter/receiver faces the window and an engagement portion provided to the cover to be engageable with the housing,
the controller comprises:
a controller body provided with the second controller; and
a cord connected to the controller body and the communication attachment member, the cord allowing the transmission/reception of the signal between the second controller and the second light emitter/receiver,
the cord is detachable from the controller body, and
the controller body comprises a third light emitter/receiver configured to receive the signal from the first light emitter/receiver and send the signal to the first light emitter/receiver.

5. The physical quantity measuring device according to claim 1, wherein
the plate comprises a connection pin connected to the signal transmission unit, the cylindrical portion surrounding the connection pin,
and
the engagement portion comprises an engagement piece configured to be engaged with an outer circumference of the cylindrical case.

6. The physical quantity measuring device according to claim 4, wherein
the plate comprises a connection pin connected to the signal transmission unit and a cylindrical portion surrounding the connection pin,
the cover comprises a recess configured to be in contact with an outer circumference of the cylindrical portion, and
the engagement portion comprises an engagement piece configured to be engaged with an outer circumference of the cylindrical case.

* * * * *